UNITED STATES PATENT OFFICE.

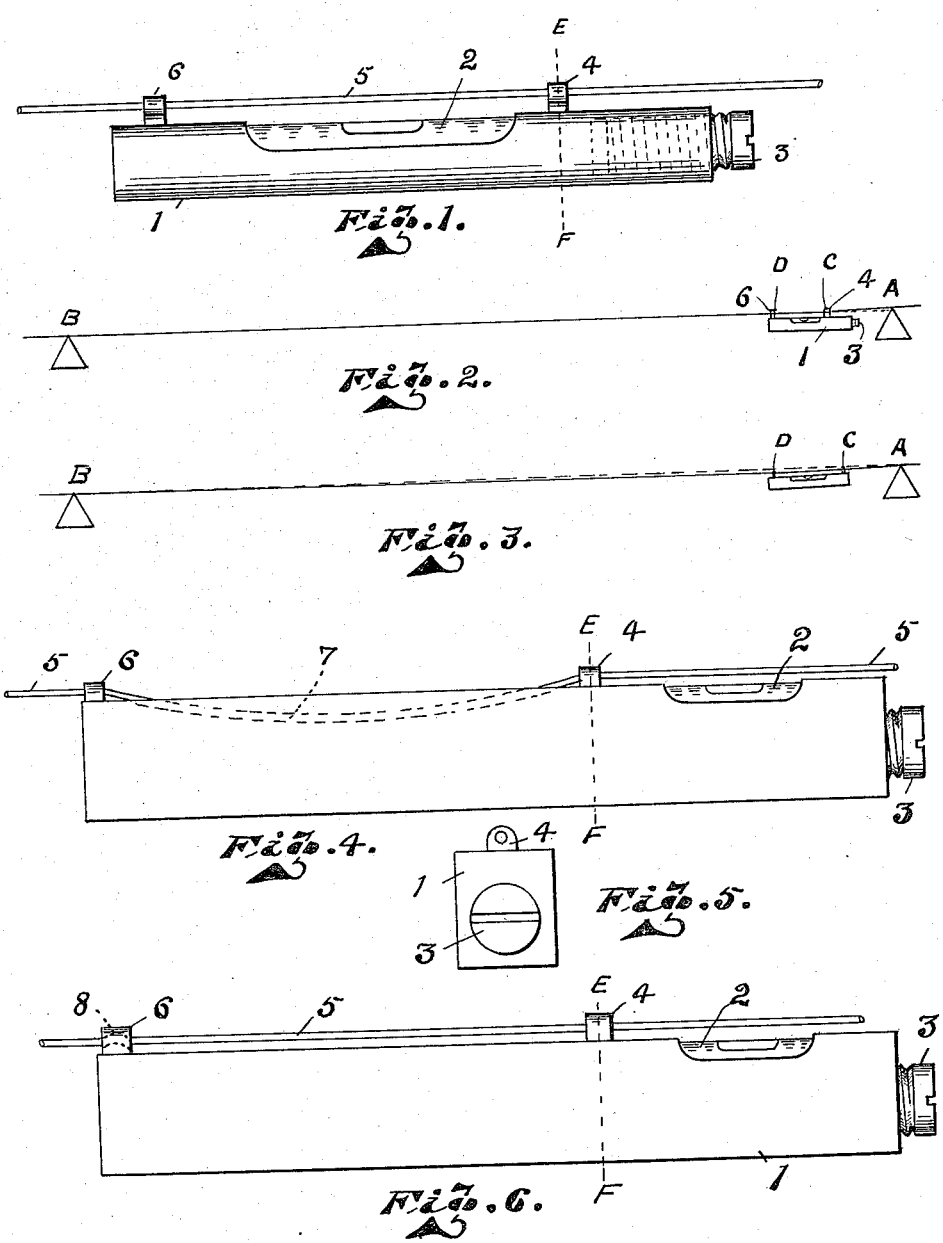

GEORGE M. FALLS, OF DULUTH, MINNESOTA.

LINE-LEVELING DEVICE.

1,176,439.  Specification of Letters Patent.  Patented Mar. 21, 1916.

Application filed March 29, 1915. Serial No. 17,869.

*To all whom it may concern:*

Be it known that I, GEORGE M. FALLS, a citizen of the United States, residing at Duluth, in the county of St. Louis and State of Minnesota, have invented certain new and useful Improvements in Line-Leveling Devices, of which the following is a specification, reference being had therein to the accompanying drawing.

My invention relates to improvements in line leveling devices, the object of which is to devise such an instrument which may be adjusted to more perfect alinement than heretofore, the device having certain details of construction hereinafter described.

Further objects and advantages of the present improvement will be set forth in the following description and drawings, in which—

Figure 1 is a side elevation of my improved line level. Fig. 2 is a diagrammatic illustration of the method of operating my improved line level. Fig. 3 is a diagrammatic view illustrating the present method of line leveling and the errors thereof. Fig. 4 is a side elevation of a modified form and adaptation of the line level. Fig. 5 is an end view of Fig. 4. Fig. 6 is another modified form of line level.

In order that the value of the present invention may be more perfectly understood and appreciated, it may be said that levels in general use for leveling lines in carpentry, masonry and landscape and farm planning etc., are liable to constant error due to the accepted construction of the instrument. The present form usually consists in a simple spirit level of light construction suspended from both ends to the line in question by means of suitable hooks. In practice the line, however tight will sag in some slight degree between the points of contact A, B, (Figs. 2 and 3). The two bearing points C and D, of the level (Fig. 3) now in general use, being practically equally weighted, will form a slight angle from the imaginary line A, B. There will also be a variance from the line A, B, by the line A, C, formed by the weight of the instrument at the point C. As a consequence, the bubble indicator of the spirit level is not dependable, but merely indicates the degree of horizontal balance to be found between the points C and D. This might be overcome to some extent by placing the line level at a point midway between the points A and B, but the disadvantage of such a course is obvious.

Referring to the drawings in detail, in which like reference numerals designate similar parts, 1 represents the body portion of the level, which is preferably of tubular form and constructed of some light material, such as aluminum. Contained within the body portion 1 is a spirit level 2, of the usual construction. At one end of the body portion 1, and preferably threaded within the same, is a weight 3, which may be in the form of a set screw, by means of which the device may be made considerably heavier at the said end, so that the center of gravity of the entire device will be relatively close to this weighted end and at the same time be adjustable to overcome possible variations. In Figs. 1, 4 and 6 the center line of gravity is indicated by the dotted line E, F. Therefore it is designed to attach to the top of the device, directly on the line E, F, which is the center of gravity, a principal attaching member 4, which may be simply in the form of a loop or hook capable of containing therein the line 5. At the opposite or lighter end of the level is similarly located another loop or hook 6, in direct horizontal alinement with the loop 4, but which serves merely as a guide for the line 5, the weight of the level upon the line being borne entirely by the attaching member 4, by virtue of its position, as hereinbefore described.

It is to be understood that any manner of means for adjusting the level 2 may be employed, such being in common use and not forming any part of my present invention.

From the above description it will be seen that in my device the degree of balance shown by the indicator of the level 2, will show the exact status of the line 5 from the point B to C, Fig. 2, or as will be seen practically the entire distance between the point of contact A and B, and therefore a greater degree of accuracy may be had by the construction herein disclosed.

In Figs. 4, 5 and 6, modifications of my device are shown, wherein the instrument is in the usual rectangular form as used by carpenters, etc., for other purposes than line leveling, although the design is devised to be weighted, and carrying attaching means and guides properly placed, as has been shown heretofore. On account of the balance being upon the guide 4, placed at the center of gravity it might be argued that if the loop 6, be in any manner larger than the diameter of the line 5, which is designed to pass therethrough, a tilting of the instrument might result. I have, therefore, shown in Fig. 4, a means whereby the line 5 may be led from the loop 4, through a suitable tunnel 7, to the loop 6, whereby the line 5 may be kept taut within the loop 6, as is desired. In Fig. 6, I have shown a modification of the loop 6, whereby a like result may be secured. The passage 8 through the loop 6 is vertically irregular, sufficiently to allow the line 5, to bind upon the walls of the said loop, which will accomplish the results desired.

Having thus described my invention, what I claim and desire to secure by Letters Patent is—

1. A line leveling device comprising a casing, a spirit level carried therewithin, suspension means carried by the top of the said casing, and a weight adjustably carried by one end of the case for the purpose described.

2. An improved line leveling device comprising a tubular casing, a spirit level within said casing, suspension means carried by the upper face of the said casing and a weight carried by the said casing, said weight comprising a member having external screw-threads thereupon, one end of the casing having internal screw-threads, the external screw-threads of the weight meshing with the internal screw-threads of the casing.

3. An improved leveling device comprising a body portion, a spirit level carried thereby, line engaging means carried by the body portion at two points, the said points located adjacent the ends of the body portion and an adjustable weight carried by one end of the body portion whereby the line engaging means adjacent the weight may be located at the center of gravity of the instrument.

4. An improved leveling device, comprising a body portion, a spirit level carried thereby, two members carried by the upper face of the body portion and providing means for suspending it, a line passing through the said members, one of the said members carrying the entire weight of the instrument and the other member acting as a guide.

5. An improved line leveling device comprising a tubular body-portion, a spirit level carried thereby, two members carried by the upper face of the body-portion providing suspension and guiding means therefor, a line passing through the two said members, a weight screw-threaded within one end of the tubular casing whereby the suspension member adjacent the weight will be located at the center of gravity of the instrument and whereby the said weight may be adjusted to keep the said suspension member at the center of gravity of the instrument.

6. An improved leveling device, comprising a body portion, a spirit level carried thereby, two members carried by the upper face of the body portion and providing means for suspending it, a line passing through the said members, one of said members having free passage for the line and the other member having retarded passage for the line, and means whereby the entire weight of the leveling device is carried by the first-mentioned suspending member.

In testimony whereof I hereunto affix my signature in the presence of two witnesses.

GEORGE M. FALLS.

Witnesses:
S. GEO. STEVENS,
N. ELAMOND.

Copies of this patent may be obtained for five cents each, by addressing the "Commissioner of Patents, Washington, D. C."